L. N. PFEIFFER.
FENCE WIRE SPLICING.
APPLICATION FILED JULY 19, 1913.
1,107,104.
Patented Aug. 11, 1914.
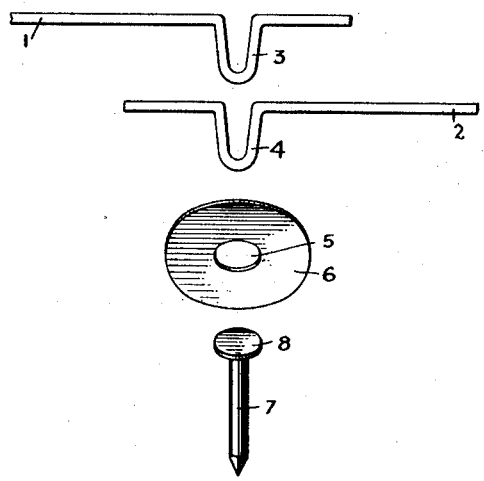
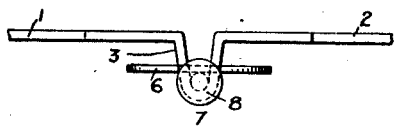
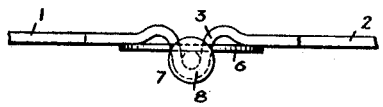
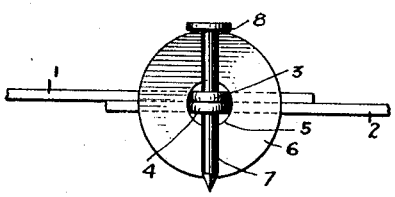
WITNESSES
INVENTOR
Louis N. Pfeiffer
BY
ATTORNEYS

UNITED STATES PATENT OFFICE.

LOUIS N. PFEIFFER, OF KENTON, OHIO.

FENCE-WIRE SPLICING.

1,107,104. Specification of Letters Patent. Patented Aug. 11, 1914.

Original application filed May 1, 1913, Serial No. 764,784. Divided and this application filed July 19, 1913. Serial No. 779,900.

*To all whom it may concern:*

Be it known that I, LOUIS N. PFEIFFER, a citizen of the United States, and a resident of Kenton, in the county of Hardin and State of Ohio, have invented a new and Improved Fence-Wire Splicing, of which the following is a full, clear, and exact description.

This invention relates to a wire splicing for fencing, although it is not limited to this use, and the invention is a division of my application Serial Number 764,784, filed May 1, 1913, made in accordance with the requirements of the Patent Office.

The invention has for its object to provide an improved joint for connecting the ends of the wires together and the method of making the joint, the advantages being that a joint can be easily and quickly made, and at the same time possesses great strength and resisting power to longitudinal strains on the wire.

For a more complete understanding of the invention reference is to be had to the accompanying drawing taken in connection with the following description and claims.

In the accompanying drawing, which illustrates one embodiment of the invention, and wherein similar reference characters are employed to designate corresponding parts throughout the several views, Figure 1 is a perspective view of the various elements in separated relation that constitute the joint or splice; Fig. 2 is a plan view of the joint before the same is completed but with the parts all assembled; Fig. 3 is a plan view of the completed joint; and Fig. 4 is a side view thereof.

Referring to the drawing, 1 and 2 designate the two fence or other wires that are to be spliced, and adjacent the extremities of these wires U-shaped bights 3 and 4 are formed in the respective wires, the making of the bights being effected by means of a tool such as is designated in the parent application hereinbefore referred to. These bights are therefore similar and they are of such size as to pass into an opening 5 in a disk or washer 6. After the washer is inserted on the bights a headed pin 7 is inserted between the rounded or closed end portions of the bights and the washer 6, said pin having a head 8 which rests on the top of the washer, as clearly shown in Fig. 2. The open or base portions of the bights are spread farther open so that the wires 1 and 2 and the extremities beyond the bights are bent against the side of the washer opposite from that engaged by the pin 7. This completes the forming of the splice, and by reason of the disposition of the parts it is impossible for the wires to pull longitudinally apart, and in fact the greater the strain tending to pull the wires apart the tighter will be the gripping or interlocking of the wires with the pin and washer.

From the foregoing description taken in connection with the accompanying drawings the advantages of the method of operation and of the device shown will be readily understood by those skilled in the art to which the invention appertains.

Having thus described my invention, I claim as new and desire to secure by Letters Patent:

1. A splicing of the class described comprising the ends of wires formed with bights of the same size and one overlapping the other, said bights extending in the same direction and parallel with each other, a ring placed over the bights, and a headed pin inserted through the ends of the bights projecting through the ring and engaging both bights, the head of the pin engaging the said ring.

2. A wire splice comprising the ends of the wires to be spliced, bights formed on the wires inwardly from the extremities and the bights being of the same size and arranged in overlying relation, said bights extending in the same direction and disposed parallel, a ring applied to the bights, and a pin engaging the ring and passing through the portions of the bights projecting through the ring.

In testimony whereof I have signed my name to this specification in the presence of two subscribing witnesses.

LOUIS N. PFEIFFER.

Witnesses:
 JAMES RAY STILLINGS,
 MILDRED NIXON.

Copies of this patent may be obtained for five cents each, by addressing the "Commissioner of Patents, Washington, D. C."